Patented Sept. 21, 1926.

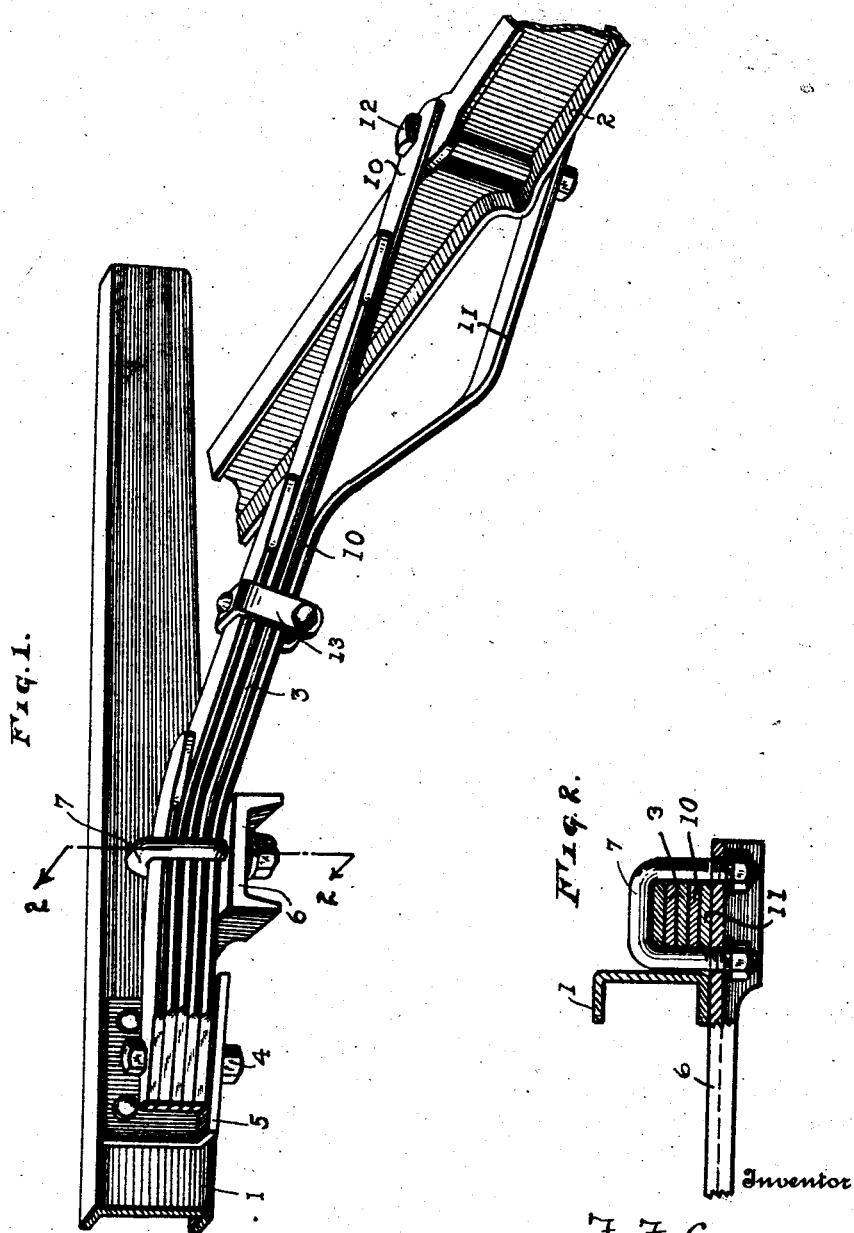

1,600,315

UNITED STATES PATENT OFFICE.

FORREST F. CAMERON, OF CLEVELAND, OHIO, ASSIGNOR TO EDGAR B. DAVIS, OF BROCKTON, MASSACHUSETTS.

SPRING SUSPENSION FOR MOTOR VEHICLES.

Application filed February 7, 1923. Serial No. 617,484.

This invention relates to vehicle spring suspensions and more particularly to those of the cantilever type.

An object of this invention is to provide an improved suspension for the frame of a motor vehicle whereby the forward end of such frame will be connected to the front axle by means of springs which will not only carry the load but will tend to keep the top and bottom edges of the axle in substantially vertical planes when the vehicle is being operated.

A further object of the invention is to provide a spring mechanism which is comparatively rigid for the ordinary shocks arising from irregularities in the road bed, and yet which is relatively more flexible than spring suspensions commonly used, when an unusual obstruction is encountered by the front wheels, or in case of collisions.

A further object of the invention is to provide a spring suspension which will compensate without undue strain for any vertical movement of the front axle or any tendency of the lower part of the axle to swing due to shocks or obstructions.

Further objects will be apparent from the following description and annexed drawings.

Referring to the drawings,

Figure 1 is a perspective view of the spring showing its attachment to the front axle and the frame.

Fig. 2 is a sectional view on line 2—2, Fig. 1.

In the drawings is shown a frame member 1 of the vehicle and a portion of the front axle 2, together with a spring 3 connecting them, it being understood that the other side of the frame is correspondingly connected to the front axle by a similar spring.

Each spring 3 comprises a series of spring leaves bolted as at 4 through their rear ends to an angle plate or other suitable support 5 secured to the frame 1 of the vehicle. The fulcrum support for the spring leaves of the cantilever may be a channel 6 suitably secured to the frame of the vehicle. For holding the leaves on the support a U-bolt straddles them and is fastened to the channel 6 by nuts. The spring 3 comprises two members 10 and 11. The upper one 10 is made up of leaves progressively decreasing in length from the top to the bottom and secured to the top face of the front axle which is of the usual I-beam construction. The lower member 11 consists of a spring leaf secured to the lower face of the axle. Both of the spring members lie in the same vertical plane and incline forwardly and outwardly from the vehicle frame to the front axle. A suitable shackle bolt 13 may be used to prevent the springs from spreading.

The spring member 11 is formed with a double or reverse curve, each portion of which has a relatively large radius. This construction is comparatively rigid against the ordinary vibrations and shocks arising from irregularities in the road bed and tends to hold the axle in a vertical plane. The double curve, however, does permit the spring to compensate for shocks or vibrations of the front axle by lengthening or shortening without undue stretching or bending, when the front wheels of the vehicle meet such obstructions as will force the axle to move up or down relative to the frame or will force the lower part of the front axle to swing slightly forward or backward relative to the frame.

It will therefore be seen that the tendency of the spring to hold the axle comparatively rigid, yet permitting vertical movement and relatively slight swinging movement thereof when obstructions are encountered, results in the production of a spring suspension of exceptionally easy riding qualities. In fact the action of the spring member 11 is comparable to that of a snubber in that it counteracts the recoil of the relatively stiffer spring member 10. This tendency to prevent the vibration of the front axle as it goes over rough ground renders the motor vehicle much easier to steer for the vibrations will not be transmitted to the steering mechanism to cause jerking of the steering wheel in the hands of the driver.

It will also be noticed that with my construction when an extraordinary obstruction is encountered by the front wheels, or a collision occurs, the lower spring member being more flexible will permit the axle to move backwardly or forwardly a relatively greater distance without injuring the spring or axle than with the usual spring suspensions. Whether the axle will move backwardly or forwardly, of course, depends upon the nature of the collision and especially upon the mounting of the wheels with respect to the axle.

In addition to the advantages above specified, it may be noted that I have provided a cantilever spring suspension in which both of the spring members 10 and 11 are load supporting.

It will also be seen that the spring members 3 preferably diverge forwardly toward the front axle to take up any longitudinal thrust of the axle, as is well understood in the art.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a motor vehicle the combination with a frame of a front axle and a pair of cantilever spring members connected to the forward end of the frame and diverging forwardly toward said axle, said spring members being connected to the frame and rigidly connected to upper and lower faces of the axle and each of said spring members bearing a portion of the load, one of said spring members being adapted to flex when longitudinal stresses are applied thereto.

2. The combination with a vehicle frame and front axle of a cantilever spring for supporting said frame upon said axle, comprising a substantially straight, relatively stiff spring member connecting said frame and axle and an additional compensating spring member between the frame and axle and rigidly connected to the axle for holding the axle comparatively rigid but yieldingly resisting movement of the axle under exceptional shocks or stresses applied longitudinally of the compensating spring 3. In a motor vehicle the combination with a frame of a front axle and cantilever springs for supporting the frame on the axle, each of said springs comprising upper and lower members rigidly connected to the frame and to the upper and lower faces of the front axle, said lower members having a double curve therein between the axle and the frame in order that said lower member may flex when stresses are applied longitudinally thereto.

4. In a motor vehicle the combination with a frame of a front axle and a pair of cantilever springs, each of said springs connected at one end to the forward end of said frame and comprising upper and lower members rigidly connected to the upper and lower faces of the front axle, said upper member being relatively stiff and said lower member being comparatively rigid against ordinary vibrations in the axle from irregularities in the road bed and yieldingly resistant to extraordinary vibrations to permit movement of the axle vertically and to permit a relatively slight swinging movement, said lower member being adapted to yieldingly resist stresses applied longitudinally thereto.

5. In a motor vehicle the combination with a frame of a front axle and a pair of spring members connecting the axle to the frame, said members being rigidly connected to the upper and lower portions of said axle and comprising a relatively stiff spring member and a spring member tending to hold said axle in vertical alinement when the axle moves under the influence of the irregularities in the road, but capable of compensating for movements of the front axle when unusual shocks are encountered by flexing longitudinally relative thereto.

6. In a motor vehicle the combination with a front axle of a pair of cantilever springs, each of said springs connected at one end with the forward end of the frame and comprising upper and lower members connected respectively to the upper and lower faces of the front axle by a common bolt, said upper member being relatively stiff and said lower member being formed with a double curve between its connection to the frame and the axle, whereby said member tends to hold the front axle in vertical alinement but compensates for extraordinary shocks tending to twist the front axle.

7. In a motor vehicle the combination with a frame of a pair of axles and cantilever springs, each of said springs comprising upper and lower members connected at their rear ends to the frame and at their forward ends to the upper and lower faces respectively of the front axle by common bolts, said members being in the same vertical plane, the upper member being relatively stiff and the lower member being formed with a relatively slight double curve therein adapted to yield longitudinally in order to relieve abnormal twisting moments developed in said front axle.

8. In a motor vehicle the combination with a frame of a front axle and a pair of contilever springs, said springs being connected to the frame near its forward end and extending forwardly and outwardly for connection with the axle, each of said springs comprising upper and lower members in vertical alinement, the upper member being relatively stiff and the lower member being reversely curved to compensate for movements of the axle relative to the frame, the outer ends of said springs being rigidly bolted to said axle.

In testimony whereof, I hereunto affix my signature.

FORREST F. CAMERON.